United States Patent [19]
Stikeleather et al.

[11] Patent Number: 5,547,420
[45] Date of Patent: Aug. 20, 1996

[54] APPARATUS FOR PULVERIZING ANIMAL CARCASSES

[75] Inventors: Larry F. Stikeleather, Raleigh; Jerry R. McKeithan, Jr., Arden, both of N.C.

[73] Assignee: North Carolina State University, Raleigh, N.C.

[21] Appl. No.: 356,686

[22] Filed: Dec. 15, 1994

[51] Int. Cl.⁶ .................................................. A22C 17/00
[52] U.S. Cl. .......................... 452/138; 452/141; 452/142; 241/243; 241/260.1
[58] Field of Search ....................... 452/141, 138, 452/142, 143; 241/260.1, 261, 243, 236, 101.76, DIG. 38; D7/372; 110/106, 232

[56] References Cited

U.S. PATENT DOCUMENTS

| | | | |
|---|---|---|---|
| 625,739 | 5/1899 | Buerk | 452/142 |
| 2,584,262 | 2/1952 | De Lamater, Sr. | 241/243 |
| 3,076,462 | 2/1963 | Meek et al. | 452/143 |
| 4,182,592 | 1/1980 | Henryson | 241/260.1 |
| 4,221,340 | 9/1980 | dos Santos | 241/260.1 |
| 4,339,084 | 7/1982 | Eriksson | 241/260.1 |
| 4,524,916 | 6/1985 | Keyes et al. | 241/101.76 |
| 5,076,504 | 12/1991 | Young | 241/92 |
| 5,322,792 | 6/1994 | Peguy | 435/311 |
| 5,402,950 | 4/1995 | Blair et al. | 241/260.1 |

FOREIGN PATENT DOCUMENTS

| | | | |
|---|---|---|---|
| 21643 | 11/1916 | Denmark | 241/243 |
| 823061 | 11/1951 | Germany | 24/243 |

Primary Examiner—Willis Little
Attorney, Agent, or Firm—Richard E. Jenkins, P.A.

[57] ABSTRACT

A poultry and swine pulverizing or grinding apparatus comprises an enclosed housing having an inlet end and an outlet end. A grinding drum is rotatably mounted within the enclosed housing and provided with raised cutting teeth extending in a helical orientation along the longitudinal length of the grinding drum. A carcass retention element is positioned adjacent the length of the grinding drum and cooperates therewith to facilitate pulverizing or grinding of animal carcasses by the grinding drum into small size particles which exit the housing through the outlet end. The grinding drum of the apparatus is motivated by an operatively connected motor.

24 Claims, 8 Drawing Sheets

APPARATUS FOR PULVERIZING ANIMAL CARCASSES

TECHNICAL FIELD

The present invention relates to animal carcass processing, and more particularly to an apparatus for pulverizing animal carcasses for disposal purposes by fermentation and the like.

RELATED ART

The increased public concern for the environment and the resulting stricter regulations regarding the disposal of proteinaceous waste material presents a daunting challenge for industries involved in food production such as the poultry and hog industries. These industries must dispose of a large amount of solid wastes from processing plants, hatcheries and from normal on-farm mortality. Almost all of the solid by-products from processing plants (about 25% of live weight) are currently converted into animal by-product meals and fat by the U.S. rendering industry for use in animal foods, pet foods and other unrelated uses such as in paint and plastic manufacturing. By contrast, however, at the present time, only about 5% of the waste from farms and hatcheries is rendered due primarily to the high transportation costs and inferior quality of the waste material.

The amount of by-product waste from U.S. poultry and swine farms and hatcheries that must be disposed of or utilized is very large and thus presents significant environmental, biological and financial problems to the poultry and swine industries. For example, a typical flock of 10,000 turkeys will produce about five tons of dead carcasses during an 18-week growing period, and a flock of 20,000 broilers grown to 49 days of age will produce about one ton of dead carcasses. By way of further example, a 1,000 sow farrow-to-finish unit will produce about 7.5 tons of dead hog carcasses per year. On the basis of recent U.S. poultry and swine production estimates, in excess of 800,000 tons of dead poultry and hatchery waste and in excess of 500,000 tons of dead hogs must be disposed of each year.

The majority of dead poultry and swine and hatchery wastes are disposed of by burial in landfill and on-farm disposal pits, incineration, composting and rendering. Each of these methods have particular regulatory, economical, operational or ecological limitations which are well known to those familiar with the art. Rendering dead stock and hatchery wastes into feed ingredients provides the most efficient recycling of nutrient resources, but the potential risk of spreading disease and the limitations in collection and quick transport from farm to rendering plants prohibit its widespread usage.

Alternative methods of proteinaceous waste disposal that allow for the conversion of the animal by-product waste into useful and valuable products are urgently needed, especially in the areas of dense poultry and swine populations. Lactic acid fermentation of the proteinaceous waste material offers the possibility of economically disposing of dead stock without contaminating the environment with excessive nutrients and odor. It can also provide an income from subsequent recovery and recycling of the processed material into feed ingredients and the like. The ensiled waste product is stable during long-term storage so as to minimize farm-to-farm collection frequency, and the acidic pH of the waste product is substantially free of pathogenic viruses and bacteria so that it can be stored/transported to a rendering plant or other user without a significant risk of spreading disease to either animals or man.

Successful lactic acid fermentation of animal carcasses, offal and hatchery waste can be accomplished by grinding these materials into small particles and mixing the small particles with an appropriate amount of readily fermentable carbohydrate, water and fermentation culture. Other components such as proteolytic enzymes and antioxidants may also be added to enhance the quality of the end product. The mixture can then be placed in a sealed and vented container to encourage and maintain anaerobic fermentation.

However, the lactic acid fermentation method for disposing of on-farm swine and poultry carcasses has not been widely used to date because of the very intensive labor requirement to grind the waste materials into small particles. Applicant has developed a relatively low cost and easy to use apparatus for grinding animal carcasses into small particles and has now met the long-felt need for such an apparatus to facilitate wider use of lactic acid fermentation process for disposing of poultry and swine carcasses as well as many other uses for the finely ground waste particles which are known to those skilled in the art.

DISCLOSURE OF THE INVENTION

In accordance with the present invention, applicant provides an apparatus for pulverizing animal carcasses and the like comprising an enclosed housing having an intake opening and an outlet opening. Grinding means is positioned between the intake and outlet openings of the enclosed housing for producing finely ground organic matter from animal carcasses thrown into the intake opening of the enclosed housing. The grinding means comprises a grinding drum having raised cutting teeth extending in helical orientation along the longitudinal length thereof and a longitudinally extending carcass retention means positioned adjacent the length of the grinding drum for cooperation therewith to facilitate pulverizing of animal carcasses by the grinding drum. A motor is provided for rotating the grinding drum of the animal carcass pulverizing apparatus of the invention.

Accordingly, it is an object of the present invention to provide an apparatus for pulverizing organic material, such as poultry and swine animal carcasses, into small size particles suitable for subsequent fermentation, extrusion, drying and/or disposal.

It is another object of the present invention to provide an improved apparatus for pulverizing animal carcasses which provides high volume processing of animal carcasses and yet is inherently low in maintenance and low in cost to use.

It is still another object of the present invention to provide an apparatus for pulverizing animal carcasses which is relatively simple in construction and provides a unique grinding drum utilizing a strand of chainsaw chain for highly efficient grinding and pulverizing of animal carcasses processed by the apparatus.

Other objects, features and advantages of the present invention will be apparent from the following detailed description of the preferred embodiments with reference to the drawings described hereinbelow.

BEST MODE FOR CARRYING OUT THE INVENTION

Figure 1:
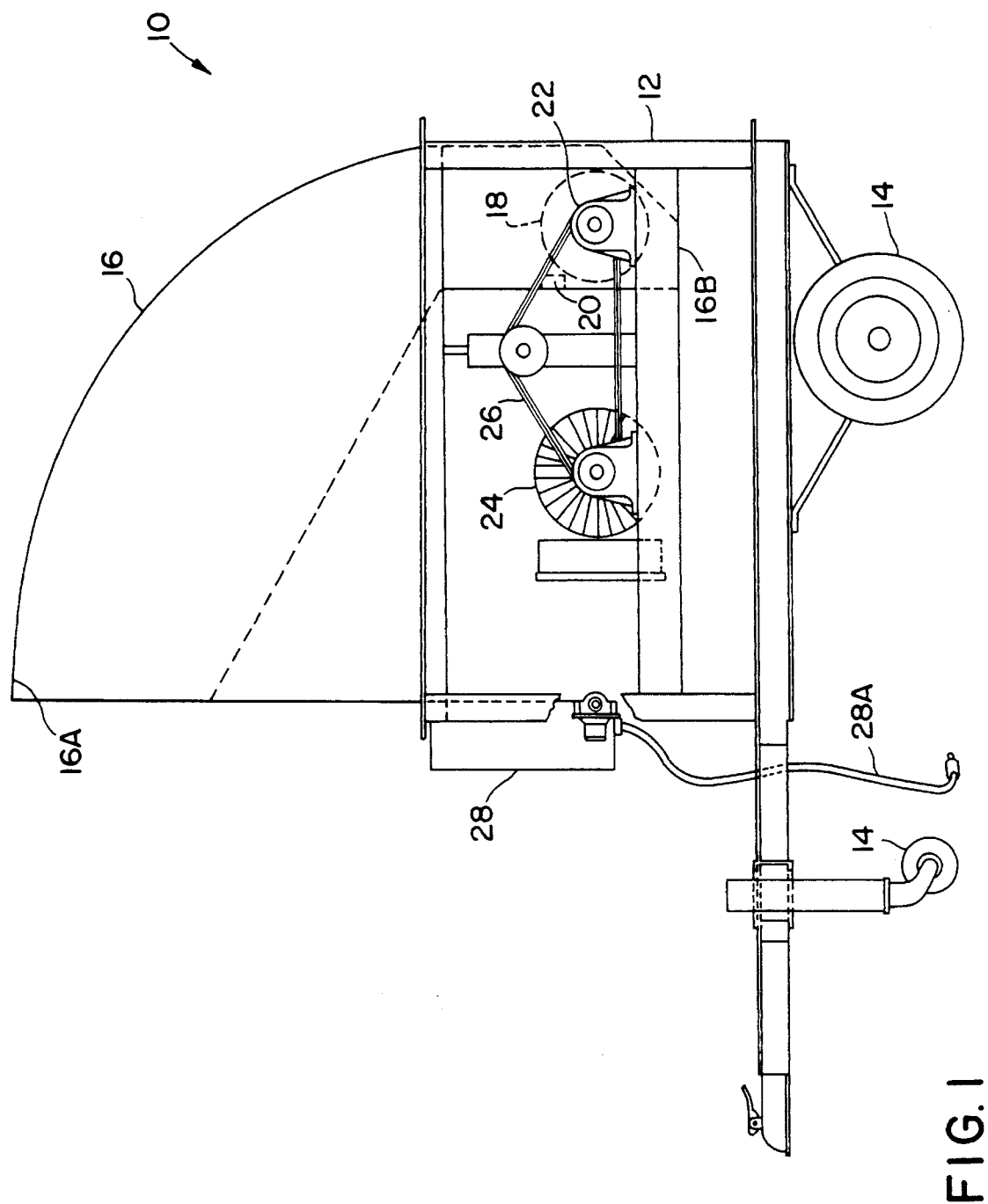
FIG. 1 is a side elevation of the animal carcass pulverizing apparatus according to the present invention.
Figure 2:
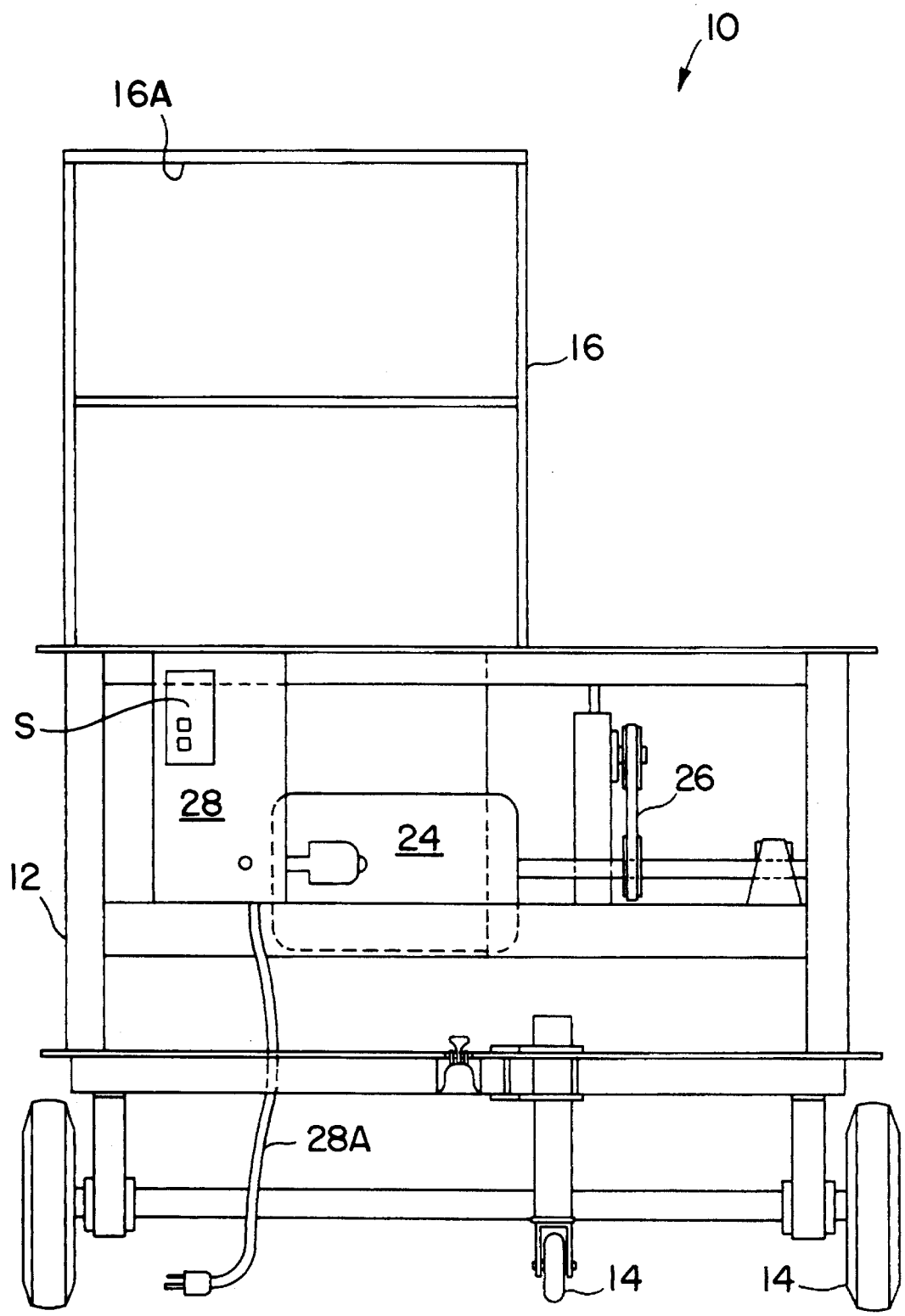
FIG. 2 is a front elevation view of the animal carcass pulverizer shown in FIG. 1.
Figure 6:
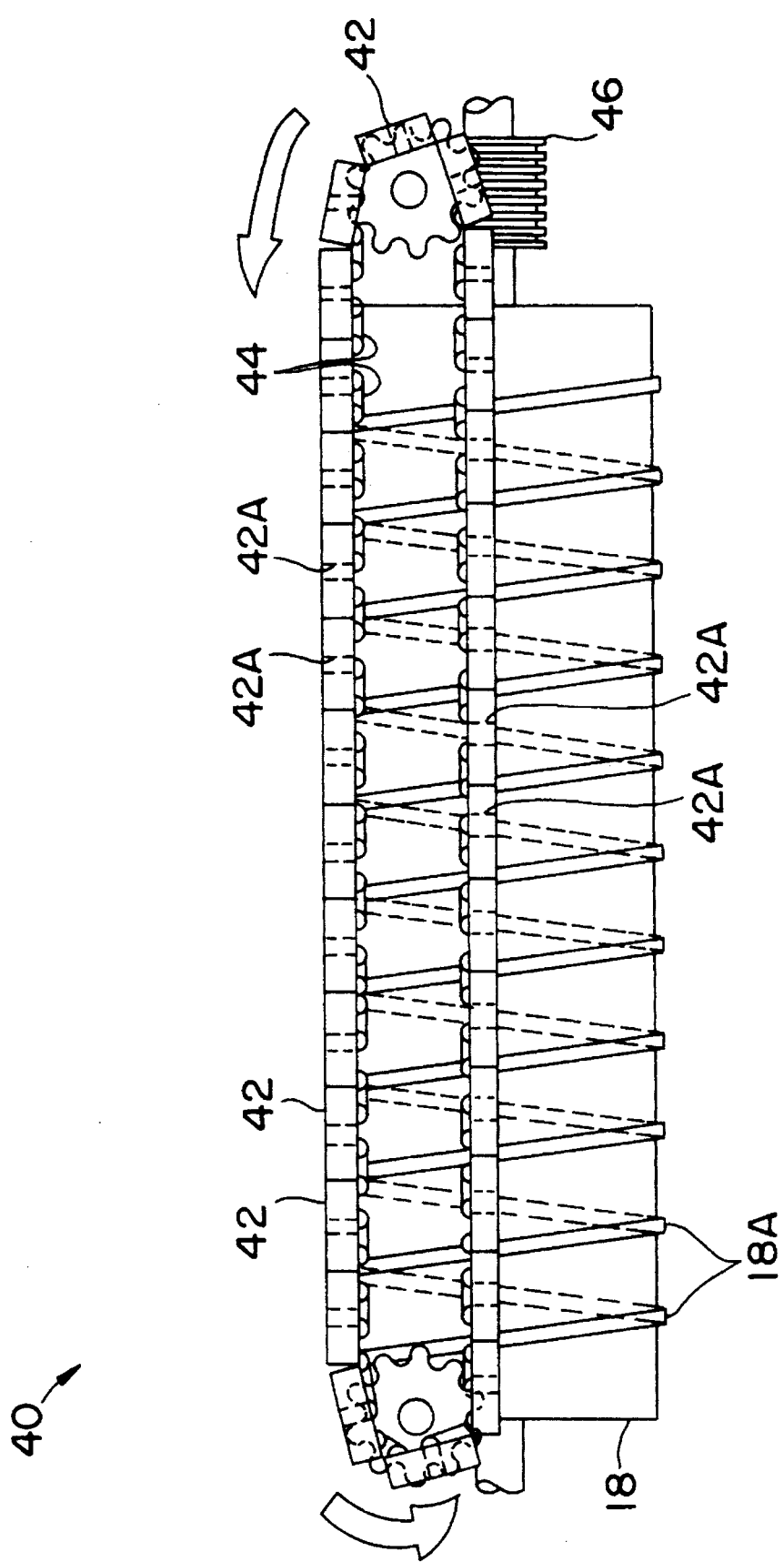
FIG. 6 is a front elevation view of a fourth embodiment of the grinding system utilized in the animal carcass pulverizing apparatus according to the present invention.

Referring now more particularly to the drawings, FIGS. 1, 2 and 6 illustrate the animal carcass pulverizing apparatus of the invention which is generally designated 10. Pulverizing apparatus 10 provides a grinder which is capable of very efficiently grinding organic matter such as poultry and swine carcasses into small, uniform particles. Apparatus 10 makes use of a readily available cutting device in the form of a length of chainsaw chain secured to a grinding drum (which will be described in detail hereinbelow) for ease of on-farm maintenance. Apparatus 10 may be used in a transportable embodiment as best shown in FIGS. 1, 2 and 6 or may be integrated with fermentation storage tanks or conveyors in order to dispose of the finely ground poultry and/or swine carcass material by techniques well known to those skilled in the art such as fermentation, deep burying, incineration, composting, extrusion, pelletizing, drying and the like. Regardless of which ultimate waste disposal procedure is utilized, prior pulverizing of the poultry or swine carcasses into small, uniform particles is beneficial and there is a long-felt need for an effective and economical apparatus to do so.

A preferred embodiment of apparatus 10 is best seen in FIGS. 1, 2 and 6 and comprises a frame 12 which is mounted on wheels 14 in a trailer-like configuration so as to be adapted to be pulled by a truck or other suitable vehicle (not shown). Pulverizing apparatus 10 further comprises an enclosed housing 16 (manufactured from a 20 gauge sheet steel) which defines an intake opening 16A at the top end thereof and an outlet opening 16B at the bottom end thereof. A poultry and swine carcass grinding mechanism is mounted within enclosed housing 16 and comprises grinding drum 18 and cooperatively associated carcass retention bar 20.

As can best be seen in FIGS. 3–6 of the drawings, grinding drum 18 (which will be described in specific detail hereinbelow) is oriented (although other orientations are contemplated by applicant as within the scope of the invention) within enclosed housing 16 and carcass retention bar 20 extends substantially parallel to the longitudinal axis of grinding drum 16 and is positioned adjacent but spaced-apart from grinding drum 16 for cooperation therewith to facilitate pulverizing by grinding drum 18 of animal carcasses introduced into enclosed housing 16. The finely pulverized or ground animal carcass material will exit enclosed housing 16 by dropping through outlet opening 16B thereof.

Grinding drum 18 is rotatably mounted at each end thereof on conventional pillow block bearings 22 which are secured to frame 22. A motor 24, most suitably a DAYTON brand Model No. 6K885 high torque, capacitor start 230 VAC single phase motor having 10 horsepower is used to drive grinding drum 18 at a rotating speed of between about 1000 to 3000 RPM by means of a conventional v-belt and pulley assembly 26 (optional). Thus, it can be appreciated that motor 24 directly drives grinding drum 18 through v-belt and pulley assembly 26 without the necessity for an intermediate transmission. Also, grinding drum 18 could be mounted directly to the shaft of motor 24 (not shown) as a matter of design choice. Motor 24 is electrically connected to and actuated by an on/off switch S of control panel 28. Thus, in use, electric cord 28A of control panel 28 would be plugged into a suitable electric outlet in order to provide a current to motor 24 when the motor is actuated with on/off switch S of control panel 28. It will be appreciated that although applicant has described a specific motor, drive assembly and control system for motivating grinding drum 18 of apparatus 10, any similar power source for motivating grinding drum 18 may be used as a matter of design choice in the present invention.

Referring specifically now to FIGS. 3–6, applicant wishes to describe in detail the unique grinding mechanism of apparatus 10 which provides the ability to pulverize or grind poultry or swine carcasses into small particles suitable for subsequent processing and/or disposal. As noted hereinabove, grinding drum 18 is rotatably mounted to frame 12 by means of bearings 22 at each end thereof so as to rotate about its longitudinal axis. Grinding drum 18 is most suitably constructed of thick wall pipe (such as aluminum or steel) or a cylinder of plastic (such as polyethylene) and is provided with a helical groove 18' extending along the circumferential service of grinding drum 18. Helical groove 18' is sized so as to fixedly receive a strand of conventional chainsaw chain 18A therein which is helically wrapped around grinding drum 18 and anchored at each end thereof by means of an adjustable clevis and anchor stud in the drum. Most suitably, the depth of helical groove 18' in the grinding drum 18 is established such that the top cutting edge of chainsaw chain teeth 18A is between about 1/8 to 1/4 inch above the surface of grinding drum 18.

Figure 3:
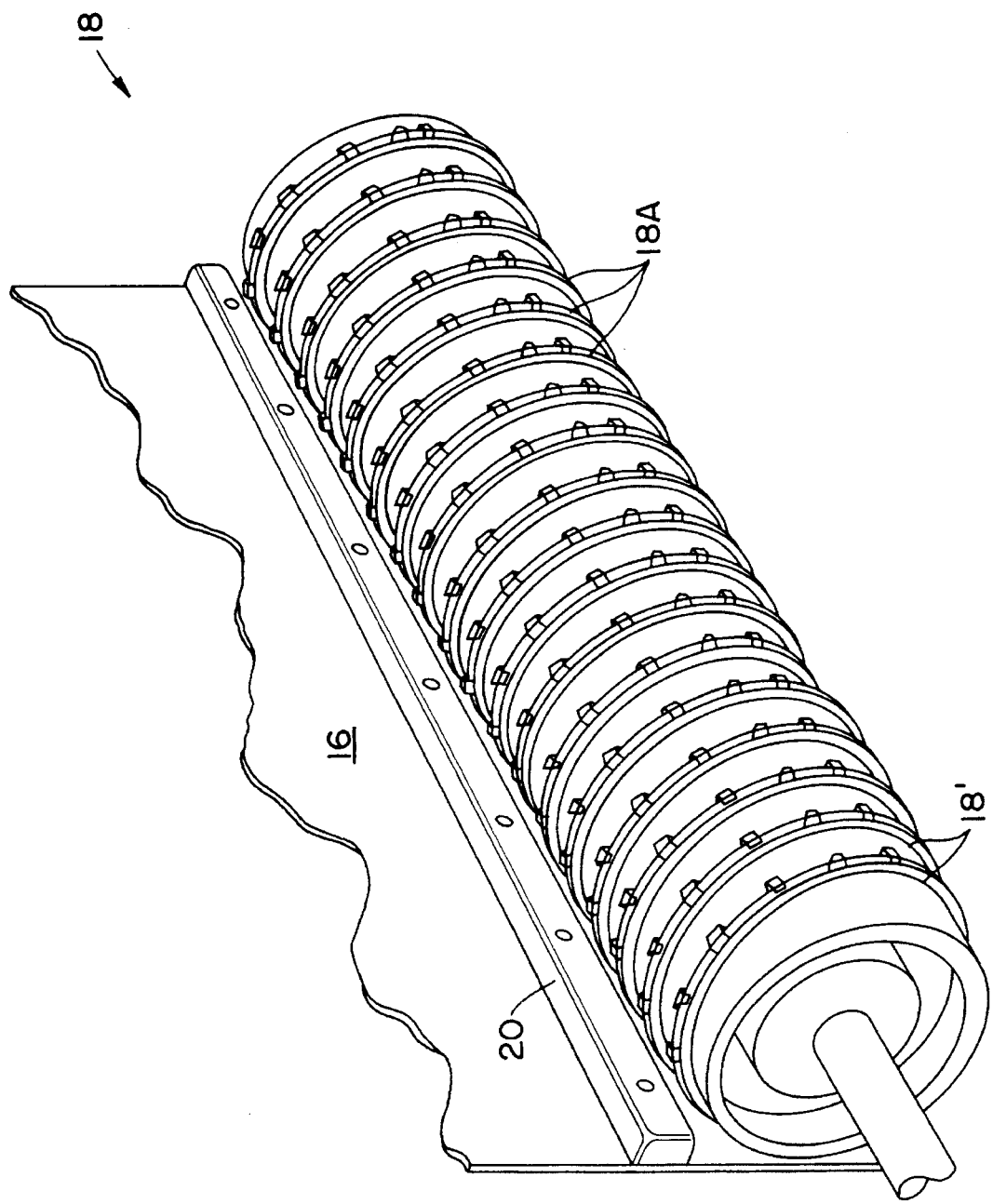
FIG. 3 is a perspective view of the grinding system used in the animal carcass pulverizing apparatus according to the present invention.
Figure 4:
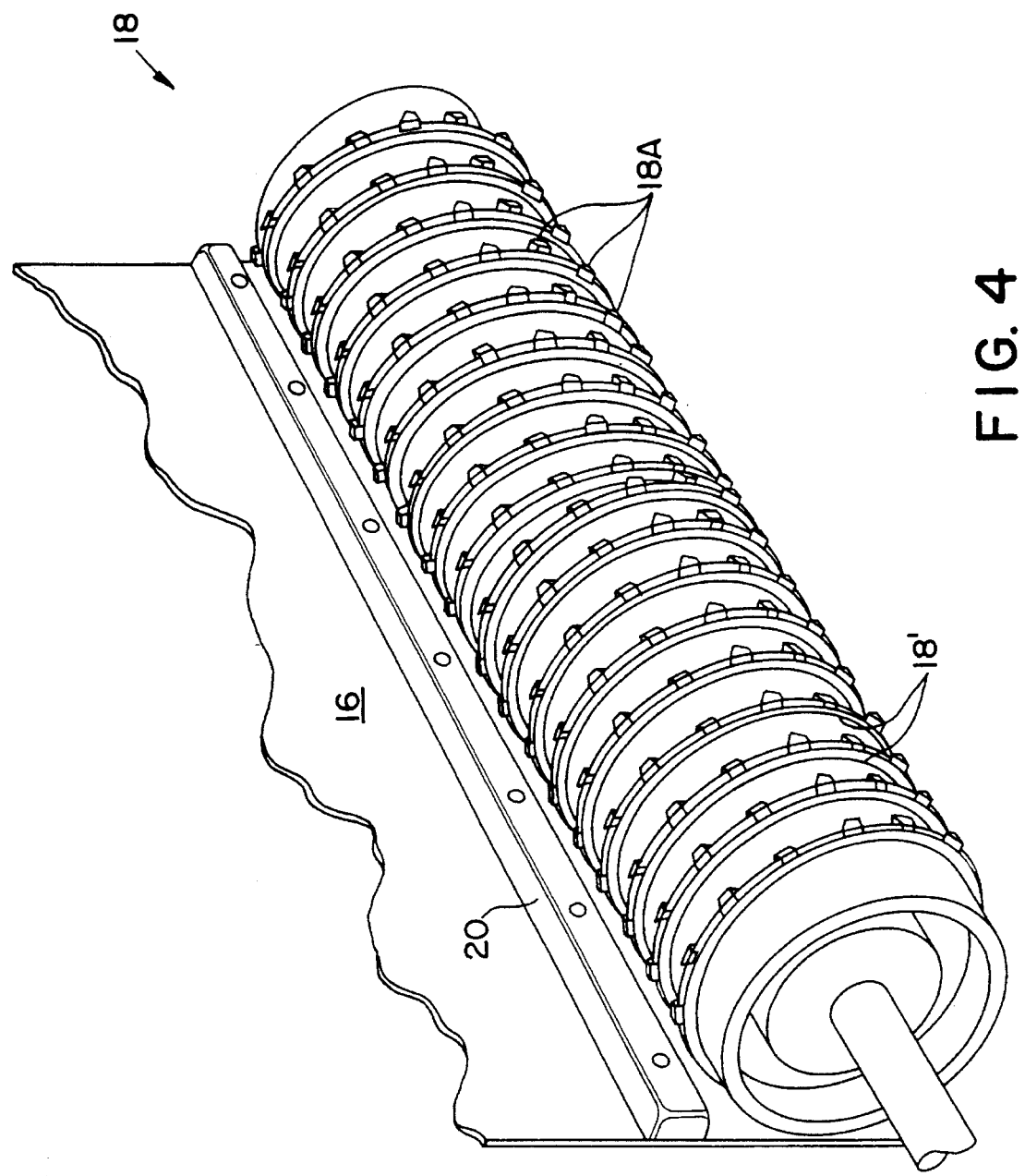
FIG. 4 is a perspective view of a second embodiment of the grinding system used in the animal carcass pulverizing apparatus according to the present invention.

As best seen in FIGS. 3 and 4, a carcass retention bar 20 is positioned parallel to and spaced-apart from grinding drum 20 so as to provide a minimum clearance between the bar and the teeth of chainsaw chain 18A. Thus, carcass retention bar 20 acts to stop the rotation and/or movement of the carcass being pulverized or ground by grinding drum 18 so as to allow the teeth of chainsaw chain 18A to grind or pulverize (e.g., cut) the carcass material into fine particles which then pass between grinding drum 18 and carcass retention bar 20. Once the finely ground carcass material has passed beneath carcass retention bar 20, the centripetal forces of grinding drum 18 act to throw the finely ground carcass material off of grinding drum 18 and through outlet opening 16B of enclosed housing 16. As mentioned hereinbefore, the finely ground waste material may then be subsequently processed for ultimate use and/or disposal.

Although a number of subsequent processing steps are well known in the art, applicant particularly contemplates that apparatus 10 is well suited for use in combination with a fermentation process and/or extrusion pelletizing processes. Applicant further contemplates that a non-transportable embodiment of apparatus 10 could be mounted directly to the top of a fermentation tank such that an appropriate amount of readily fermentable carbohydrate, water and fermentation culture could be added to the mixture, and the mixture then sealed in a vented container to encourage and maintain an anaerobic fermentation. This use of applicant's novel pulverizing apparatus for lactic acid fermentation of poultry or swine carcasses would provide a particularly attractive technique for disposing of the dead stock without contaminating the environment with excessive nutrients and odor. The fermented product could, of course, either be recycled into certain feed ingredients by any of a number of processes (including extrusion, pelletizing, drying, etc.) rendered, incinerated or buried.

It can be seen with reference to FIGS. 3 and 4 of the drawings that grinding drum 18 may be constructed with a single direction chainsaw chain helix (right or left-hand helix) such as the right-hand helix shown in FIG. 3. Alternatively, the strand of chainsaw chain 18A could be secured to grooves within grinding drum 18 in such a fashion as to define a right-hand helix on one half of the grinding drum 18 and a left-hand helix on the other half of the grinding drum 18 (see FIG. 4) so that the chainsaw chain helix would tend to encourage the poultry or swine carcass being ground to the midsection of grinding drum 18. If a conveyor (not shown) were positioned beneath outlet opening 16B of enclosed housing 16, this would be particularly desirable since the majority of the finely ground material would be positioned in the medial portion of the conveyor. This, of course, would not be a significant consideration if the animal carcass pulverizing apparatus were integrated directly to a fermentation tank or the like. However, regardless of the helical configuration of chainsaw chain strand 18A the distance between carcass retention bar 20 and the top surface of the grinding teeth cannot be less than the height of chainsaw chain strand 18A above the surface of grinding drum 18 since chainsaw chain strand 18A is "traveling" with respect to carcass retention bar 20 during grinding due to the helical pitch thereof.

As mentioned hereinbefore, chainsaw chain strand 18A is secured within helical groove 18' in grinding drum 18 in a generally helical pattern so that the pulverizing or grinding action is continual and uniform in the longitudinal direction of grinding drum 18 without the need to have cutting teeth covering the entire surface of grinding drum 18. This reduces the cost of constructing apparatus 10 by reducing the quantity of cutting teeth required to be present on the circumferential surface of grinding drum 18. Also, applicant contemplates that one continuous strand of chainsaw chain 18A may be utilized and secured to grinding drum 18 for ease of replacement and maintenance of carcass pulverizing apparatus 10. As would be apparent to one skilled in the art, the aggressiveness of grinding drum 18 can be varied by: (1) altering the pitch of the helix of chainsaw chain strand 18A (e.g., the smaller the pitch the greater the number of cutting passes the chain makes per revolution of the grinding drum); (2) varying the rotating speed of grinding drum 18; and (3) changing the clearance between the top surface of the teeth of chainsaw chain strand 18A and the surface of grinding drum 18.

Figure 5:
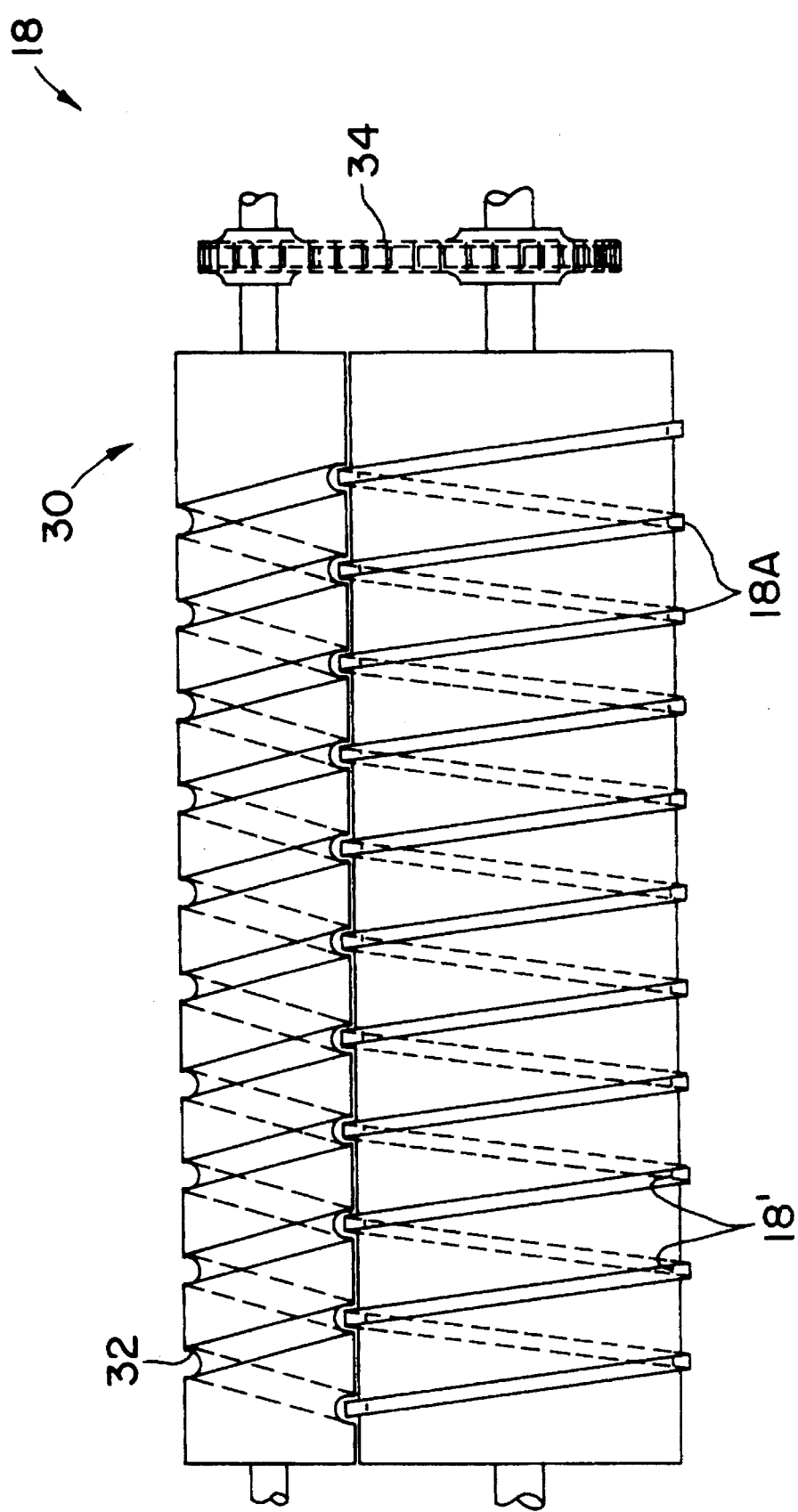
FIG. 5 is a front elevation view of a third alternative embodiment of the grinding system used in the animal carcass pulverizing apparatus according to the present invention.

Referring now to FIG. 5, an alternative embodiment of the grinding mechanism of carcass pulverizing apparatus 10 is shown. In this embodiment of applicant's invention, a mating grooved roller 30 is used in lieu of carcass retention bar 20 and is believed likely to result in providing even finer and more uniform ground carcass particles. Grooved roller 30 is provided with a helical groove 32 therein defining a pitch such that as the grooved roller 30 is driven by grinding drum 18 (via sprocket and chain assembly 34), groove 32 at the line of interaction between the two cylinders always coincides with chainsaw chain strand 18A. In view of the mating relationship between rotating grinding drum 18 and rotating grooved roller 30, the only ground carcass material allowed to pass therebetween and out outlet end 16B of housing 16 would be carcass material ground small enough to pass through the space between the cutting teeth of chainsaw chain strand 18A and groove 32 of grooved roller 30 through which it is passing. Thus, helical groove 32 of grooved roller 30 could be varied in size relative to the teeth of chainsaw chain strand 18A so that the fineness of the carcass material could be changed in accordance with desired processing parameters.

Applicant presently contemplates that the preferred embodiment of grooved roller 30 shown in FIG. 5 of the drawings would most suitably be smaller in diameter than grinding drum 18 and would not be required to rotate at the same circumferential speed as grinding drum 18, and grooved roller 30 and grinding drum 18 would be in light sliding contact or near contact. As a matter of design choice, the ratio of grooved roller 30 RPM to grinding drum 18 RPM will serve to determine the groove pitch required in grooved roller 30. For example, if grooved roller 30 were being driven by grinding drum 18 at twice the RPM of grinding drum 18, the pitch of groove 32 defined within grooved roller 30 would be half the pitch of chainsaw chain strand 18A on grinding drum 18. If grooved roller 30 and grinding drum 18 were rotating at the same RPM, the pitch of groove 32 of grooved roller 30 and chainsaw chain strand 18A would need to be equal.

Although other configurations are possible, applicant presently prefers that grooved roller 30 and grinding drum 18 should rotate in the same direction as best seen in FIG. 5. Otherwise, there could possibly be a greater tendency to tension-pull carcass material between grooved roller 30 and grinding drum 18 before the grinding process is completed.

With final reference to FIG. 5, applicant's preferred embodiment of the invention provides that the circumferential speed of grooved roller 30 should be equal to or greater than the circumferential speed of grinding drum 18 so as to facilitate expelling feathers and other material from the grinding mechanism and to minimize pinching and passing of these materials between grinding drum 18 and grooved roller 30. Optionally, a scraper bar or plate (not shown) could be provided on grooved roller 30 to prevent waste material from being carried around it during use of pulverizing apparatus 10.

With reference to FIG. 6 of the drawings, another alternative embodiment 40 of the grinding mechanism is shown which utilizes a plurality of plastic (or rubber) grooved blocks 42 secured to a continuous roller-type chain 44 in such a way that the lower run of the continuous loop of blocks 42 serve, in effect, as a moving carcass retention bar. Chain 44 carrying blocks 42 would be driven through worm gear mechanism 46 by grinding drum 18 so that the notches 42A defined within blocks 42 would coincide with the helix of chainsaw chain strand 18A at all times during the operation of grinding drum 18.

Although all of the preferred embodiments of apparatus 10 described hereinabove incorporate a strand of chainsaw chain 18A around grinding drum 18, applicant contemplates that the invention includes any and all other structural configurations that would provide a helical orientation of grinding teeth upon the circumferential surface of grinding drum 18 to perform the grinding function of the invention.

Figure 7:
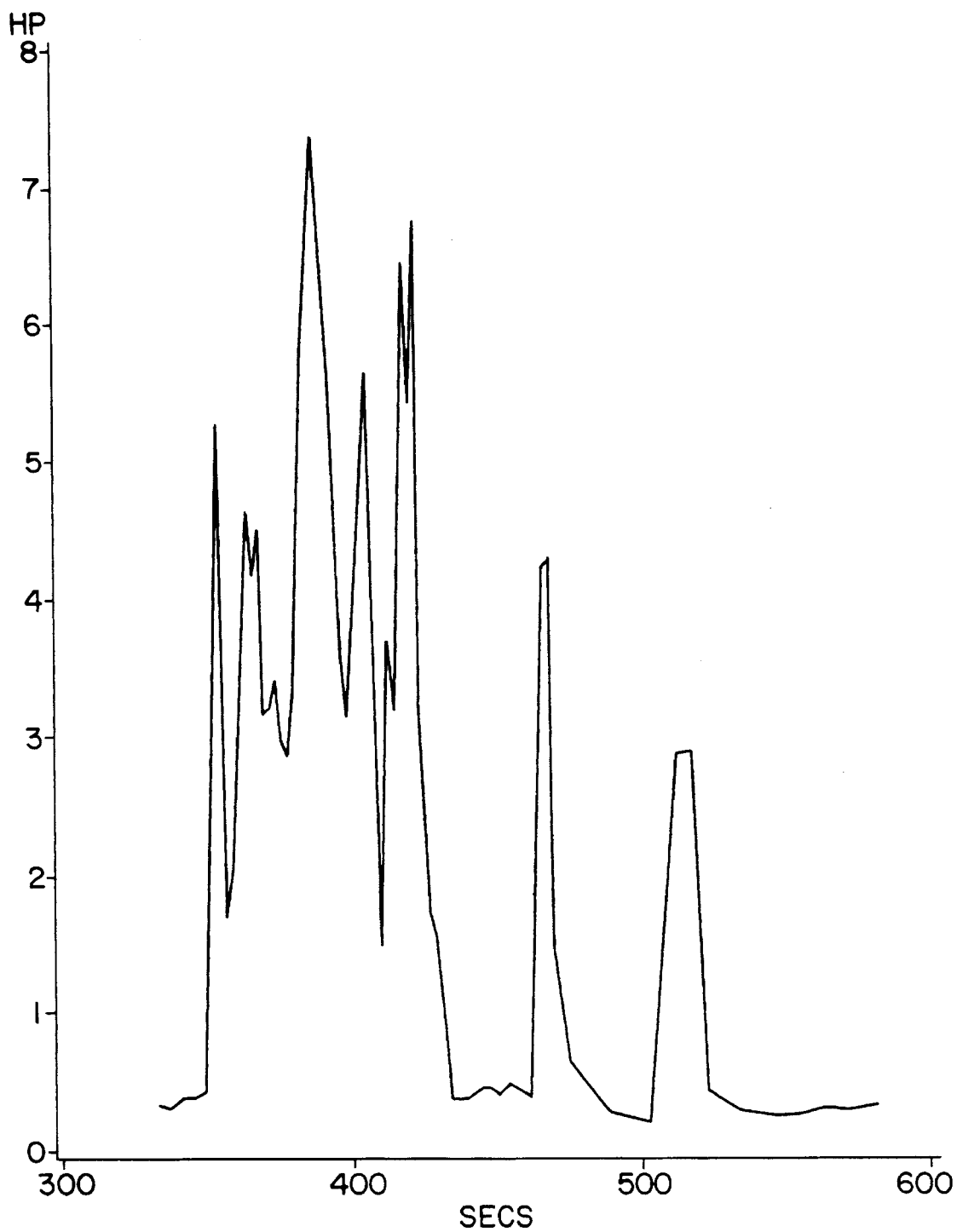
FIG. 7 is a graph of motor horsepower vs. grinding time using the apparatus according to the present invention to process turkeys.
Figure 8:
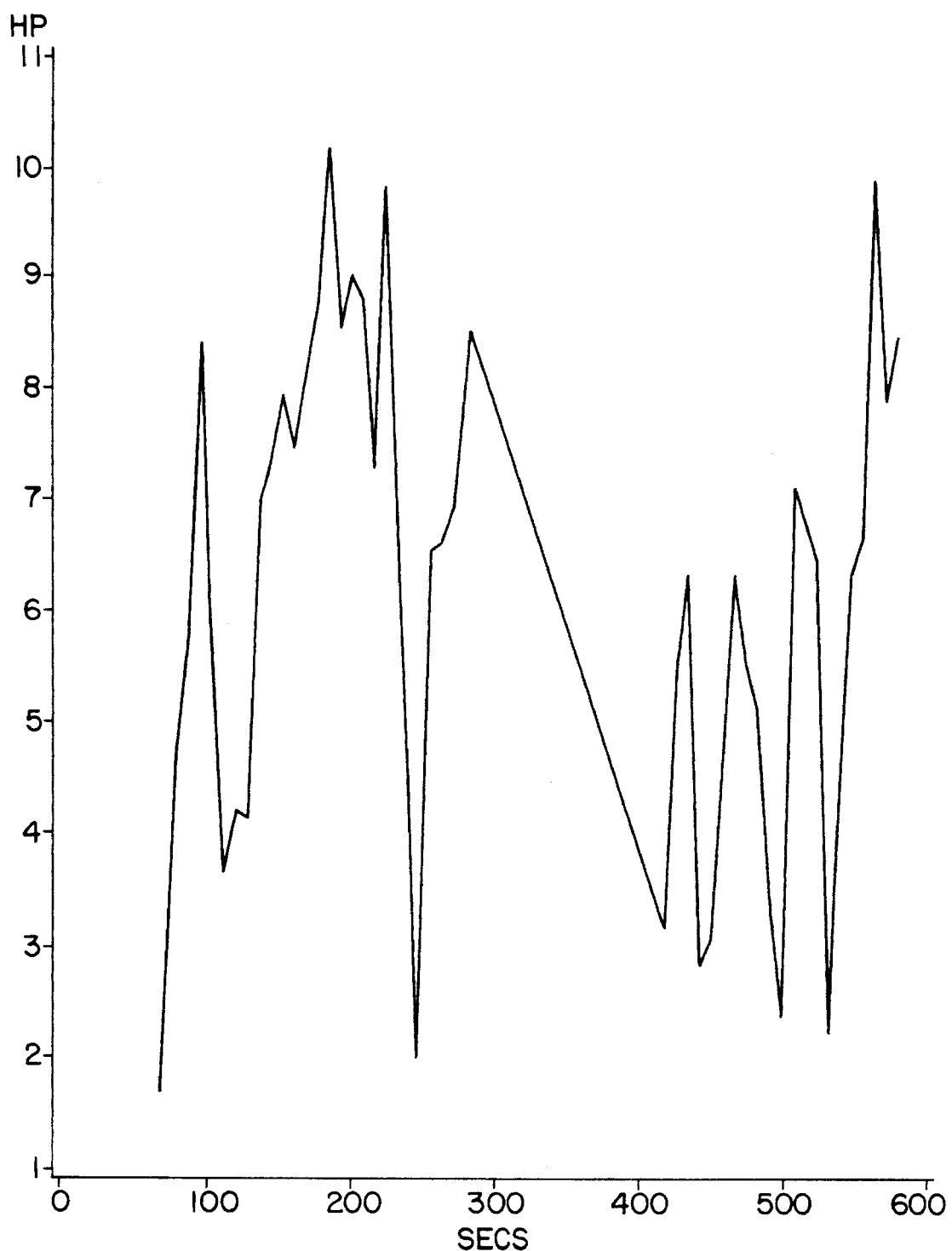
FIG. 8 is a graph of motor horsepower vs. grinding time using the apparatus according to the invention to process hogs.

The performance of apparatus 10 can be appreciated with reference to the graphs of FIGS. 7 and 8 illustrating the instantaneous horsepower input to the grinding drum 10 vs. time for turkey and hogs.

It will be understood that various details of the invention may be changed without departing from the scope of the invention. Furthermore, the foregoing description is for the purpose of illustration only, and not for the purpose of limitation—the invention being defined by the claims.

What is claimed is:

1. An apparatus for pulverizing organic material such as animal carcasses and the like for subsequent use or disposal, comprising:

an enclosed housing having an intake opening and an outlet opening;

grinding means positioned between the intake and outlet openings of said enclosed housing for producing finely ground organic matter from animal carcasses introduced into the intake opening of said enclosed housing said grinding means comprising a non-auger type grinding drum defining at least one helical groove therein and having a removable strand of raised cutting teeth mounted in said at least one helical groove with at least a portion of the cutting teeth extending radially above the surface of said grinding drum and extending in helical orientation along the longitudinal length thereof, and carcass retention means positioned adjacent the length of said grinding drum for cooperation therewith to facilitate simultaneous pulverizing of animal carcasses along the length of said grinding drum, said carcass retention means comprising a linear retention bar element mounted in spaced-apart relationship to said cutting teeth; and motor means for rotating said grinding drum.

2. An apparatus according to claim 1, wherein said apparatus is mounted on a support frame having a plurality of wheels rotatably secured thereto and wherein said support frame is adapted for attachment to a transport vehicle.

3. An apparatus according to claim 1, wherein said enclosed housing is formed from sheet steel having an upper and a lower portion and wherein the intake opening is in the upper portion and the outlet opening is in the lower portion of said housing.

4. An apparatus according to claim 1, wherein said cutting teeth of said grinding drum extend in a single direction helix along the longitudinal length of said grinding drum.

5. An apparatus according to claim 1, wherein said cutting teeth of said grinding drum define a right hand helix along a first section of the longitudinal length of said grinding drum and a left hand helix along a second section of the longitudinal length of said grinding drum so as to direct the animal carcasses and the like being ground generally toward a medial section of the longitudinal length of said grinding drum.

6. An apparatus according to claim 1, wherein said cutting teeth comprise a strand of chainsaw chain teeth which has been mounted around the circumferential surface of said grinding drum.

7. An apparatus according to claim 1, wherein said carcass retention means comprises an elongated bar mounted to said enclosed housing and extending substantially parallel to the longitudinal axis of said grinding drum, said elongated bar being spaced-apart from said grinding drum at least a distance equal to the height of said raised cutting teeth thereof.

8. An apparatus according to claim 1, wherein said motor means comprises an electric motor.

9. An apparatus according to claim 8, wherein said electric motor is directly connected to said grinding drum by a v-belt and pulley assembly.

10. An apparatus for pulverizing organic material such as animal carcasses and the like for subsequent use or disposal, comprising:

a framework;

an enclosed housing mounted to said framework and having an intake opening and an outlet opening;

grinding means positioned between the intake and outlet openings of said enclosed housing for producing finely ground organic matter from animal carcasses introduced into the intake opening of said enclosed housing, said grinding means comprising a non-auger type grinding drum defining at least one helical groove therein and having a strand of chainsaw chain teeth removably mounted in said at least one helical groove with at least a portion of the chainsaw chain teeth extending radially above the surface of said grinding drum and extending in helical orientation along the longitudinal length thereof, and carcass retention means positioned parallel to and adjacent the length of said grinding drum for cooperation therewith to facilitate simultaneous pulverizing of animal carcasses along the length of said grinding drum, said carcass retention means comprising linear retention bar element mounted in spaced-apart relationship to said chainsaw teeth; and a motor mounted to said framework for rotating said grinding drum.

11. An apparatus according to claim 10, wherein said framework comprises a support frame having a plurality of wheels rotatably mounted thereto and wherein said support frame is adapted for attachment to a transport vehicle.

12. An apparatus according to claim 10, wherein said enclosed housing is formed from sheet steel having an upper and a lower portion and wherein the intake opening is in the upper portion and the outlet opening is in the lower portion of said housing.

13. An apparatus according to claim 10, wherein strand of chainsaw chain teeth of said grinding drum extend in a single direction helix along the longitudinal length of said grinding drum.

14. An apparatus according to claim 10, wherein said strand of chainsaw chain teeth of said grinding drum define a right hand helix along a first section of the longitudinal length of said grinding drum and a left hand helix along a second section of the longitudinal length of said grinding drum so as to direct the animal carcasses and the like being ground generally toward a medial section of the longitudinal length of said grinding drum.

15. An apparatus according to claim 10, wherein said carcass retention means comprises an elongated bar fixedly mounted to said enclosed housing and spaced-apart from said grinding drum at least a distance equal to the height of said chainsaw teeth thereof.

16. An apparatus according to claim 10, wherein said motor is directly connected to said grinding drum by a v-belt and pulley assembly.

17. An apparatus for pulverizing organic material such as animal carcasses and the like for subsequent use or disposal, comprising:

an enclosed housing having an intake opening and an outlet opening;

grinding means positioned between the intake and outlet openings of said enclosed housing for producing finely ground organic matter from animal carcasses introduced into the intake opening of said enclosed housing, said grinding means comprising a grinding drum having raised cutting teeth extending in helical orientation along the longitudinal length thereof and carcass retention means positioned adjacent the length of said grinding drum for cooperation therewith to facilitate pulverizing of animal carcasses by said grinding drum, said carcass retention means comprising a grooved roller cooperatively associated with and driven by said grinding drum, said grooved roller having a helical groove therein corresponding to the helically extending cutting teeth of said grinding drum so as to matingly receive said cutting teeth therein during rotation of said grinding drum; and motor means for rotating said grinding drum.

18. An apparatus according to claim 17, wherein said helical groove of said grooved roller is larger than said raised grinding teeth of said grinding drum so as to allow the ground organic matter from animal carcasses to pass therethrough to the outlet opening of said enclosed housing.

19. An apparatus according to claim 17, wherein said grooved roller and said grinding drum rotate in the same direction.

20. An apparatus according to claim 17, wherein said carcass retention means comprises a continuous chain carrying a plurality of blocks and cooperatively associated with and driven by said grinding drum, said blocks each having one or more slots therein corresponding to the helically extending cutting teeth of said grinding drum so as to matingly receive said cutting teeth therein during rotation of said grinding drum.

21. An apparatus for pulverizing organic material such as animal carcasses and the like for subsequent use or disposal, comprising:

a framework;

an enclosed housing mounted to said framework and having an intake opening and an outlet opening;

grinding means positioned between the intake and outlet openings of said enclosed housing for producing finely ground organic matter from animal carcasses introduced into the intake opening of said enclosed housing, said grinding means comprising a grinding drum having a strand of chainsaw teeth extending in helical orientation along the longitudinal length thereof and carcass retention means positioned parallel to and adjacent the length of said grinding drum for cooperation therewith to facilitate pulverizing of animal carcasses by said grinding drum, said carcass retention means comprising a grooved roller cooperatively driven by said grinding drum, said grooved roller having a helical groove therein corresponding to the helically extending chainsaw chain teeth of said grinding drum so as to matingly receive said chainsaw chain teeth therein during rotation of said grinding drum; and a motor mounted to said framework for rotating said grinding drum.

22. An apparatus according to claim 21, wherein said helical groove of said grooved roller is larger than said chainsaw teeth of said grinding drum so as to allow the ground organic matter from animal carcasses to pass therethrough to the outlet opening of said enclosed housing.

23. An apparatus according to claim 21, wherein said grooved roller and said grinding drum rotate in the same direction.

24. An apparatus according to claim 21, wherein said carcass retention means comprises a continuous chain carrying a plurality of blocks and cooperatively associated with and driven by said grinding drum, said blocks each having one or more slots therein corresponding to the helically extending cutting teeth of said grinding drum so as to matingly receive said cutting teeth therein during rotation of said grinding drum.

* * * * *